(12) United States Patent
Thomson et al.

(10) Patent No.: US 11,487,890 B2
(45) Date of Patent: Nov. 1, 2022

(54) THIRD-PARTY ACCESS OF END-USER DEVICE ASSETS

(71) Applicant: Apple Inc., Cupertino, CA (US)

(72) Inventors: Gavin B. Thomson, Mountain View, CA (US); Richard L. Hagy, Montara, CA (US); Patrick Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 16/906,593

(22) Filed: Jun. 19, 2020

(65) Prior Publication Data

US 2021/0397728 A1    Dec. 23, 2021

(51) Int. Cl.
*G06F 21/62* (2013.01)
*G06F 16/23* (2019.01)
(Continued)

(52) U.S. Cl.
CPC ........ *G06F 21/6218* (2013.01); *G06F 3/0482* (2013.01); *G06F 16/2379* (2019.01);
(Continued)

(58) Field of Classification Search
CPC .................................................. G06F 21/6218
See application file for complete search history.

(56) References Cited

U.S. PATENT DOCUMENTS

| 10,277,601 B1 * | 4/2019 | Higgins | G06F 21/6218 |
| 2012/0113866 A1 | 5/2012 | Tenny | |

(Continued)

FOREIGN PATENT DOCUMENTS

| EP | 2579487 A1 | 4/2013 |
| KR | 20120070473 A | 6/2012 |

(Continued)

OTHER PUBLICATIONS

Dai, et al., "DASS: A Web-Based Fine-Grained Data Access System for Smartphones," 2017 IEEE International Conference on Smart Cloud (Smartcloud), Nov. 3, 2017 (Nov. 3, 2017), XP033262592, DOI: 10.1109/SMARTCLOUD.2017.45.

(Continued)

*Primary Examiner* — Roland J Casillas

(74) *Attorney, Agent, or Firm* — Blank Rome LLP

(57) ABSTRACT

This disclosure relates to systems, methods, and computer-readable media for identifying an asset privacy management trigger on an end-user device related to a third-party application. In response to identifying the asset privacy management trigger, a privacy selection interface to enable a user to select a limited asset access option is displayed. In response to the limited asset access option being selected, an asset selection interface is displayed, where the asset selection interface is configured to define a sub-set of assets of the end-user device as authorized for the third-party application based on user selection. In response to a subsequent request to access assets of the end-user device by the third-party application, the third-party application is able to access only the defined sub-set of assets. For different third-party applications or scenarios, the asset privacy management triggers and asset sub-set definitions may vary.

25 Claims, 8 Drawing Sheets

(51) Int. Cl.
    *G06F 16/54*     (2019.01)
    *G06F 3/0482*     (2013.01)
    *H04L 67/53*     (2022.01)
    *G06Q 50/00*     (2012.01)

(52) U.S. Cl.
    CPC .............. *G06F 16/54* (2019.01); *H04L 67/53* (2022.05); *G06F 2221/2115* (2013.01); *G06Q 50/01* (2013.01)

(56) References Cited

U.S. PATENT DOCUMENTS

2016/0205103 A1*   7/2016   Lee .......................... H04L 63/10
                                                                              726/30
2018/0213059 A1*   7/2018   Alsina .................... H04L 67/26

FOREIGN PATENT DOCUMENTS

| KR | 20160087731 A | 7/2016 |
| --- | --- | --- |
| WO | 2013101215 A1 | 7/2013 |
| WO | 2020117302 A1 | 6/2020 |

OTHER PUBLICATIONS

Xu, et al., "Earp: Principled Storage, Sharing, and Protection for Mobile Apps," USENIX, The Advanced Computing Systems Association, Mar. 16, 2016 (Mar. 16, 2016), XP061024953, Retrieved from the Internet: URL: https://www.usenix.org/sites/default/files/nsdi16_full_proceedings_interior.pdf [retrieved on Mar. 16, 2016].

* cited by examiner

THIRD-PARTY ACCESS OF END-USER DEVICE ASSETS

TECHNICAL FIELD

This disclosure relates generally to the field of asset management for user devices in a networked environment. More particularly, the disclosure relates to systems and processes for enabling the user of an end-user device to limit third-party application access to assets of the end-user device.

BACKGROUND

Many of today's end-user devices, including portable devices (e.g., smartphones and tablets), provide audio and image capture functionality, resulting in audio recordings, photos, and video recordings. For example, the user of a typical end-user device (e.g., a home computer, laptop, camera, tablet, or cell phone) can capture both still images and video through a camera or camera interface on the device. The captured images or videos may then be accessible in a photo library on the end-user device (or other networked device that has been granted access to the assets by the end-user). Many third-party applications provide features that involve access to assets of a user in the photo library of an end-user device. Currently, users often have only a binary option (i.e., allow access to assets completely or deny access to assets completely) for managing access to end-user device assets, such as the photo library, by a third-party application. This binary option is typically a one-time selection for each third-party application (e.g., specified the first time the third-party application is used by the end-user) and may be perceived as overly restrictive or overly permissive for many end-user device users. Techniques to improve the security and usability of the assets of an end-user device in a networked environment with third-party applications would thus be desirable.

SUMMARY

A typical user interaction with a third-party application involves installing the third-party application on an end-user device and executing the third-party application. Another option is to use the end-user device to access a website, social network, or other platform and related features associated with the third-party application. In either case, the end-user device has assets, and the third-party application includes features that access the assets. Example assets of an end-user device include photos or videos in a photo library, a microphone, or a camera. Instead of employing binary access schemes (e.g., either full access to assets or no access to assets), the disclosed systems and processes allow for limited and/or application-specific access to assets of the end-user device. Example features of a third-party application that could access assets of an end-user device include teleconferencing features, photo editing features, social media features, and online storage features.

Embodiments of the disclosure seek to provide the user of an end-user device with improved asset privacy management options by adding a limited asset access option. In some examples, the limited asset access option is a feature of an operating system and is accessible via one or more settings within the operating system of the end-user device. Once the operating system is updated, the limited asset access option is selectable in response to asset privacy management triggers (e.g., re-booting the end-user device after update of the operation system to include a limited asset access option, receiving an asset privacy management request from a third-party application, installing or using a third-party application for the first time, using a third-party application for a pre-determined amount of time, receiving an asset access request from a third-party application, or selecting an operating system asset management setting related to a third-party application). Once an asset privacy management trigger is identified, a privacy selection interface is displayed that enables the user to select the limited asset access option for a given third-party application. In some examples, the privacy selection interface enables a user to select between a full asset access option (e.g., access to all photos in a photo library), a no asset access option (e.g., access denial such that there is no access to photos in a photo library), and the limited asset access option (e.g., access to some photos in a photo library, but not to others).

When the limited asset access option is selected, an asset selection interface is displayed that enables a user to define a sub-set of assets as authorized for the third-party application. In some examples, a sub-set of assets is defined by user selection of individual assets or groups of assets (e.g., a folder-based definition, a date-based definition, or a content based-definition). Thereafter, a third-party application is able to access the sub-set of assets defined as authorized for the third-party application. As desired, asset privacy management is performed for the same third-party application multiple times (e.g., based on an asset privacy management schedule or in response to new assets being available). For example, if a third-party application requests to access the photo library of an end-user device and new photos have been added to the photo library since the last time the third-party application accessed the photo library, the request to access the photo library may be identified as an asset privacy management trigger.

One of the considerations for the proposed asset privacy management techniques involves handling different third-party application scenarios, including backwards compatibility with a legacy privacy management interface. In some scenarios, a third-party application uses a legacy request interface to communicate with the end-user device, where the third-party application may or may not already have an asset privacy policy in place with the end-user device. When a legacy request interface is used, a request to access assets by the third-party application may be identified as an asset privacy management trigger. In response to the asset privacy management trigger, the privacy selection interface for selecting asset privacy management options and the asset selection interface for defining a limited sub-set of assets (if the limited asset option is selected) may be used in a manner that is transparent to the third-party application using the legacy request interface. As used herein, "transparent" refers to the lack of awareness of the third-party application in relation to a given interface or related operations.

In one example, even if a third-party application was given full access to end-user device's photo library previously, access to the photo library can be limited using the privacy selection interface and photo selection interface operations as described herein. In this example, a limited photo library option selected by a user and related operations results in a virtual access policy to the photo library for the third-party application. From the third-party application perspective, full access to the photo library is given, where the photo library is limited by the virtual access policy to the sub-set of photos defined by the user.

In other scenarios, a third-party application using an updated request interface has an opt-out option that enables the third-party application to use the legacy binary indicators (e.g., full access or no access) with the updated request interface. In such scenarios, the third-party application is able to request access to assets of the end-user device, where the privacy selection interface for selecting asset privacy management options in response to the request and the asset selection interface for defining a limited sub-set of assets (if the limited asset option selected) is performed in a manner that is transparent to the third-party application. As desired, assets authorized for use by the third-party application can be limited using a virtual access interface if a user chooses the limited asset access option for the third-party application. From the third-party application perspective, access to the assets of the end-user device are given based on the legacy binary options (full access or no access). However, if the limited asset access option is selected by a user, assets visible to the third-party application will be limited by the virtual access interface to the sub-set of assets defined by the asset selection interface (as if the sub-set of assets is all that there is).

In other scenarios, a third-party application using an updated request interface has an opt-in option that enables the third-party application to request asset privacy management by a user, where the end-user device returns a non-binary value that indicates whether full access, limited access, or no access is authorized. In such scenarios, the third-party application may or may not already have an asset privacy policy in place with the end-user device. In either case, the third-party application is able to request asset privacy management by the user. As another option, the third-party application is able to request access to assets of the end-user device. In response to an asset privacy management trigger, the privacy selection interface for selecting asset privacy management options and the asset selection interface for defining a limited sub-set of assets (if the limited asset option is selected) is used, where the third-party application receives a non-binary indication of the asset privacy option selected by the user. With the updated request interface and opt-in option, once an asset privacy decision has been made by the user, the third-party application is not able to submit a new privacy management request. However, an end-user may change the asset access level in the settings/preferences user interface (UI).

In one example, an asset privacy management request by a third-party application results in a limited photo library option being selected by a user and related operations. In such case, a virtual access policy to the photo library is established for the third-party application. From the third-party application perspective, limited access to the photo library is given, where the photo library is limited by the virtual access policy to the sub-set of photos defined by the user.

DETAILED DESCRIPTION

Figure 1:
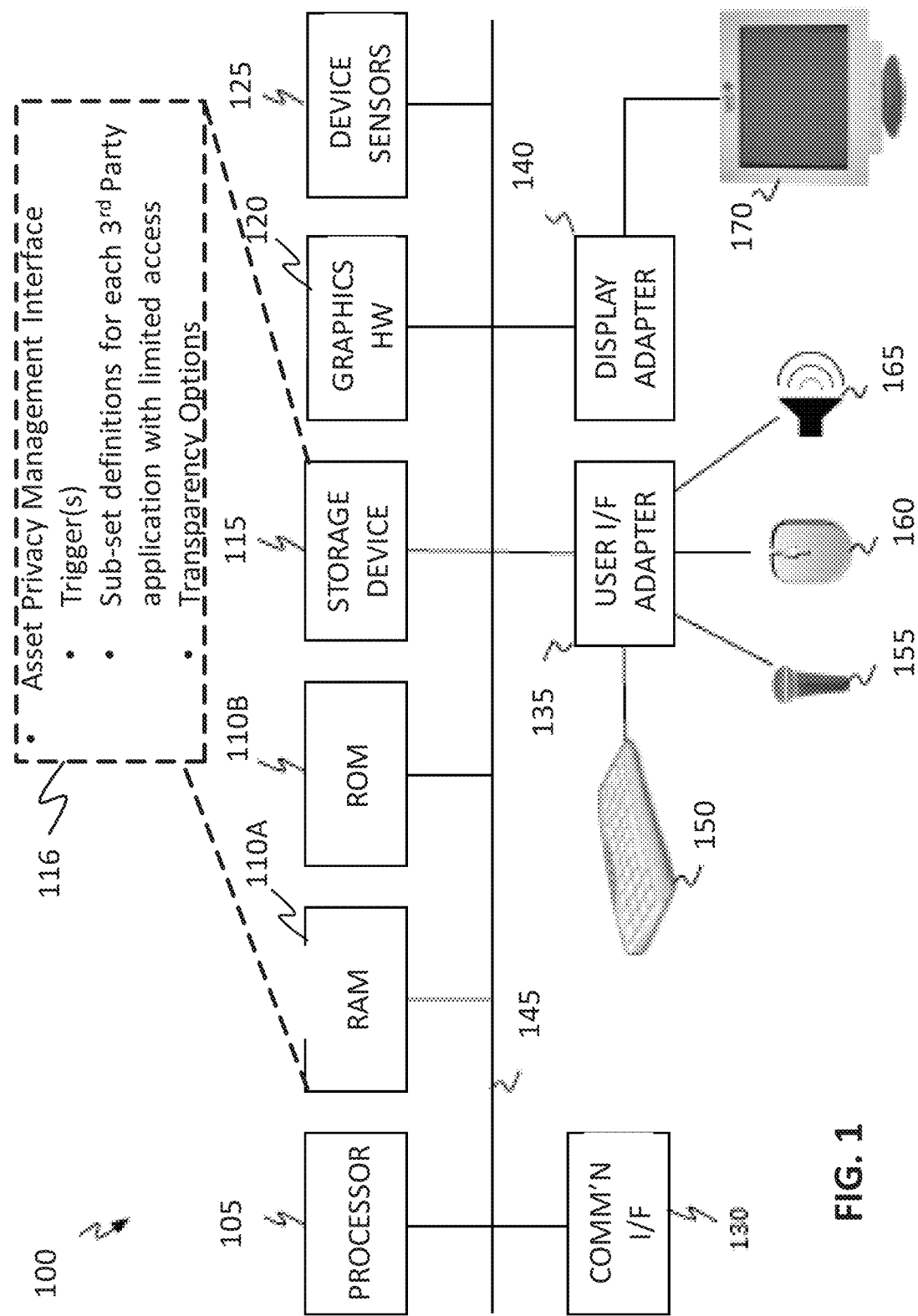
FIG. 1 is a diagram showing a representative hardware environment.

This disclosure pertains to systems, methods, and computer readable media to improve asset privacy management on an end-user device by supporting a limited asset management option. It also pertains to supporting different asset privacy management triggers (e.g., re-booting the end-user device after update of the operation system to include a limited asset management option, receiving an asset privacy management request from a third-party application, receiving an asset access request from a third-party application, installing or using a third-party application for the first time, using a third-party application for a pre-determined amount of time or selecting an operating system asset management setting related to a third-party application), which trigger user selection of asset privacy management options. If a limited asset management option is selected by a user for a given third-party application, an asset selection interface is displayed to enable a user to define a sub-set of assets as authorized for the third-party application. In some examples, a user chooses between a full asset access option, a no asset access options, and a limited asset access option for each of a plurality of third-party applications. For the limited asset access option, a sub-set of assets is defined by user selection of individual assets or groups of assets (e.g., a folder-based definition, a date-based definition, or a content based-definition). Thereafter, a third-party application is able to access the sub-set of assets defined as authorized for the third-party application. As desired, asset privacy management is performed for the same third-party application multiple times (e.g., based on an asset privacy management schedule, new assets being available, or other triggers).

In one example, asset privacy management operations are performed for privacy-sensitive resources such as a photo library, contacts, or a calendar in response to an asset privacy management trigger. After selection of an asset privacy option by a user and defining limited assets (if needed), a related policy is enforced and is used for future requests by the third-party application. As desired, subsequent asset privacy management triggers enable a user to confirm or change asset privacy management selections. For example, if a third-party application requests to access the photo library of an end-user device and new photos have been added to the photo library since the last time the third-party application accessed the photo library, the request to access the photo library may be identified as an asset privacy management trigger even if the third-party application previously received full access or limited access authorization. As another example, if a third-party application requests to access the contacts of an end-user device and new contact items have been added to the contacts since the last time the third-party application accessed the contacts, the request to access the contacts may be identified as an asset privacy management trigger even if the third-party application previously received full access or limited access authorization. As another example, if a third-party application requests to access the calendar of an end-user device and new calendar items have been added to the calendar since the last time the third-party application accessed the calendar, the request to access the calendar may be identified as an asset privacy management trigger even if the third-party application previously received full access or limited access authorization. In addition, many other asset privacy management techniques and options are discussed herein.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes and may not have been selected to delineate or circumscribe the inventive subject matter, leaving resorting to the claims as a potential necessity to determine such inventive subject matter. Reference in this disclosure to "one embodiment" or to "an embodiment" or "embodiments" means that a particular feature, structure, or characteristic described in connection with the invention is included in at least one embodiment of the disclosed subject matter, and multiple references to "one embodiment" or "an embodiment" should not be understood as necessarily all referring to the same embodiment.

It will be appreciated that, in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming—but would nonetheless be a routine undertaking for those having the benefit of this disclosure and being of ordinary skill in the design and implementation of computing systems and/or graphics systems.

Exemplary Hardware and Software

The inventive embodiments described herein relate to asset privacy management operations on an end-user device. In particular, the proposed asset privacy management operations include a limited asset privacy option. In an example embodiment, the end-user device includes a camera and a microphone to capture photos and videos, where captured photos, captured videos, the end-user device microphone, and/or the end-user device camera corresponds to assets of the end-user device. Instead of supporting only binary access options (e.g., full access or no access), the proposed asset privacy management operations allow for a limited asset access option, where a user of the end-user device is able to define a sub-set of assets as authorized for the third-party application. Since many embodiments rely on computing operations and systems, this disclosure may have implication and use in and with respect to all types of intelligent devices, including single- and multi-processor computing systems and vertical devices (e.g., cameras, gaming systems, appliances, etc.) that incorporate single- or multi-processing computing systems. The discussion herein is made with reference to a common computing configuration that may be discussed as a server system or an end-user system. This common computing configuration may have a CPU resource including one or more microprocessors. This discussion is only for illustration regarding sample embodiments and is not intended to confine the application of the invention to the disclosed hardware. Other systems having other known or common hardware configurations (now or in the future) are fully contemplated and expected. With that caveat, a typical hardware and software operating environment is discussed below. The hardware configuration may be found, for example, in a camera, a security system, a server, a workstation, a laptop, a tablet, a desktop computer, a gaming platform (whether or not portable), a television, an entertainment system, a smart phone, a phone, or any other computing device, whether mobile or stationary.

Referring now to FIG. 1, the disclosed embodiments may be performed by representative computer system 100. For example, the representative computer system 100 may act as a server or an end-user device. System 100 may be embodied in any type of device such as a camera, a general purpose computer system, a television, a set top box, a media player, a multi-media entertainment system, an image processing workstation, a hand-held device (such as a phone), or any device that may be coupled with or may incorporate image capture, audio capture, and/or processing capability. Computer system 100 may include one or more processors 105, memory 110 (110A and 110B), one or more storage devices 115, and graphics hardware 120. Computer system 100 may also have device sensors 125, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infra-red sensors, thermometers, etc. These and other sensors may work in combination with one or more GPUs, DSPs, or conventional microprocessors along with appropriate programming so the sensor outputs may be properly interpreted and/or combined and interpreted.

Returning to FIG. 1, system 100 may also include communication interface 130, user interface adapter 135, and display adapter 140—all of which may be coupled via system bus or backplane 145. Memory 110 may include one or more different types of media (e.g., solid-state, DRAM, optical, magnetic, etc.) used by processor 105 and graphics hardware 120. For example, memory 110 may include memory cache, read-only memory (ROM), and/or random access memory (RAM). Storage 115 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 110 and storage 115 may be used to retain media (e.g., audio, image, and video files), preference information, device profile information, computer program instructions organized into one or more modules and written in any desired computer programming language, and any other suitable data. When executed by processor 105 and/or graphics hardware 120 (which may also be a processor), such computer program code may implement one or more of the methods or processes described herein.

Communication interface 130 may include semiconductor-based circuits and may be used to connect computer system 100 to one or more networks. Illustrative networks include, but are not limited to: a local network, such as a USB network; a business's local area network; and a wide area network, such as the Internet; and may use any suitable technology (e.g., wired or wireless). Communications technologies that may be implemented include cell-based communications (e.g., NR, LTE, CDMA, GSM, HSDPA, etc.) or other communications (Ethernet, Wi-Fi, Bluetooth, USB, Thunderbolt, Firewire, etc.). User interface adapter 135 may be used to connect keyboard 150, microphone 155, pointer device 160, speaker 165, and other user interface devices such as a touchpad and/or a touch screen (not shown). Display adapter 140 may be used to connect one or more display units 170 through frame buffers (not shown).

Processor 105 may execute instructions necessary to carry out or control the operation of many functions performed by system 100 (e.g., image evaluation and processing). Processor 105 may, for instance, drive display 170 and receive user input from user interface adapter 135 or any other user interfaces embodied by a system. User interface adapter 135, for example, can take a variety of forms, such as a button, a keypad, a dial, a click wheel, a keyboard, a display screen, and/or a touch screen, or any combination thereof. The user interface items or widgets may be generated by the graphics hardware 120 in real time as a user interacts with the interface. Processor 105 may be any type of computing device such as one or more microprocessors working alone or in combination with GPUs, DSPs, and/or system-on-chip devices such as those found in mobile devices. Processor 105 may include one or more dedicated GPUs or graphics subsystems that accept program instructions to create or alter display information such as pixels. In addition, processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 in performing computational tasks. In some embodiments, graphics hardware 120 may include CPU-integrated graphics and/or one or more programmable GPUs.

Various embodiments of the invention may employ sensors, such as cameras. Cameras and similar sensor systems may include auto-focus systems to accurately capture video or image data ultimately used to interpret user intent or commands. Since the motion of the user may be based upon subtle activity in small regions in the captured images (e.g., hands, fingers, face, mouth, brow etc.) the autofocus system may be used to separately focus on multiple regions of the image in order to access better information.

Returning to FIG. 1, sensors 125 may capture contextual and/or environmental phenomena such as time; location information; the status of the device with respect to light, gravity, and the magnetic north; and even still and video images. In addition, network-accessible information, such as weather information, may also be used as part of the context. All captured contextual and environmental phenomena may be used to provide context to captured images, user or subject activity or information about user or subject activity. For example, in accessing a sequence of captured images, the contextual information may be used as part of the analysis. The system 100 may react to environmental and contextual events and reflect a reaction in real time by, for example, attaching contextual information to images/frames, performing one or more functions such as an image capture using a certain mode, or by causing activity on the display system through use of the graphics hardware 120.

Output from the sensors 125 may be processed, at least in part, by processors 105 and/or graphics hardware 120, and/or a dedicated image processing unit incorporated within or without system 100. Information so captured may be stored in memory 110 and/or storage 115 and/or any storage accessible on an attached network (such as the Internet). Memory 110 may include one or more different types of media used by processor 105, graphics hardware 120, and sensors 125 to perform device functions. Storage 115 may store data such as media (e.g., audio, image, and video files); metadata for media; computer program instructions; and other software; including database applications (e.g., a database storing avatar frames), preference information, device profile information, and any other suitable data. Memory 110 and storage 115 may be used to retain computer program instructions or code organized into one or more modules in either compiled form or written in any desired computer programming language. When executed by, for example, processor 105, such computer program code may implement one or more of the acts or functions described herein (e.g., implementing image analysis and trimming).

In the example of FIG. 1, the memory 110 and/or the storage 115 are represented as including asset privacy management interface instructions 116 for execution by the processor 105. When executed by the processor 105, the asset privacy management interface instructions 116 perform operations such as identifying asset privacy management triggers, defining sub-sets of assets for each third-party application granted limited asset access as needed based on user selection, storing asset privacy policy information for future use, and providing asset privacy management transparency options (to support backwards compatibility with a legacy request interface or legacy binary indicators) for different third-party applications. Additional details and options related to the asset privacy management interface instructions 116 are provided hereafter.

Figure 2:
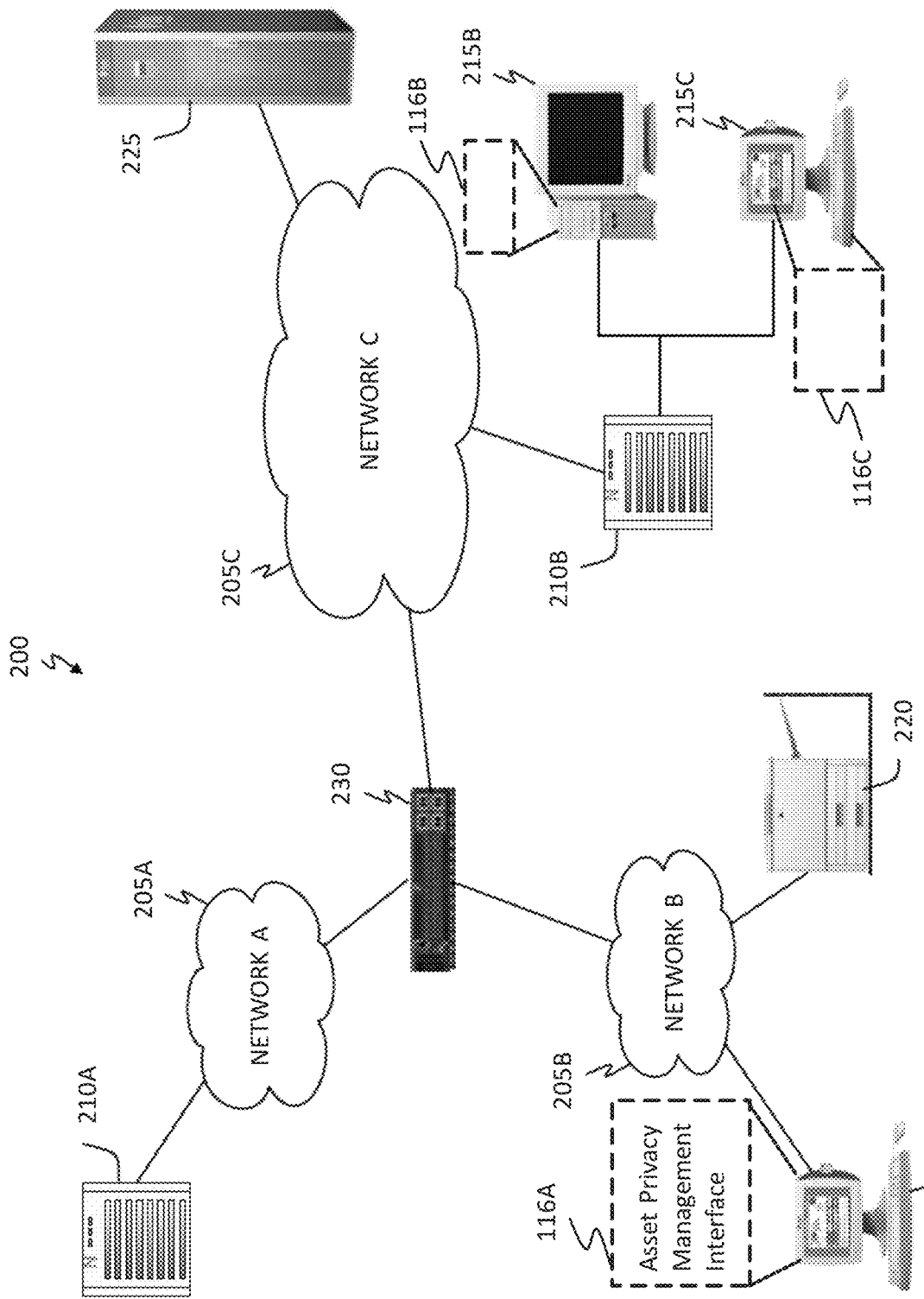
FIG. 2 is a diagram showing a representative network environment.

Referring now to FIG. 2, an illustrative network architecture 200, within which the proposed asset privacy management techniques may be implemented, includes a plurality of networks 205, (i.e., 205A, 205B, and 205C), each of which may take any form including, but not limited to, a local area network (LAN) or a wide area network (WAN) such as the Internet. Further, networks 205 may use any desired technology (wired, wireless, or a combination thereof) and protocol (e.g., transmission control protocol, TCP). Coupled to networks 205 are data server computers 210 (i.e., 210A and 210B) that are capable of operating server applications such as databases and are also capable of communicating over networks 205. One embodiment using server computers may involve the operation of one or more central systems to collect, process, and evaluate image information (e.g., frames) and/or contextual information, or other information as a proxy for mobile computing devices, such as smart phones or network-connected tablets.

Also coupled to networks 205, and/or data server computers 210, are client computers or end-user devices 215 (i.e., 215A, 215B, and 215C), which may take the form of any computer, set top box, entertainment device, communications device, or intelligent machine, including embedded systems. In some embodiments, users may employ client computers in the form of smart phones or tablets. In the example of FIG. 2, each of the client computers 215 includes hardware (see e.g., FIG. 1) and respective asset privacy management interface instructions 116A-116C to support the proposed asset privacy management techniques described herein. Also, in some embodiments, network architecture 200 may also include network printers such as printer 220 and storage systems such as 225, which may be used to store multi-media items (e.g., images) that are referenced herein. To facilitate communication between different network devices (e.g., data servers 210, end-user computers 215, network printer 220, and storage system 225), at least one gateway or router 230 may be optionally coupled therebetween. Furthermore, in order to facilitate such communication, each device employing the network may comprise a network adapter. For example, if an Ethernet network is desired for communication, each participating device must have an Ethernet adapter or embedded Ethernet-capable ICs. Further, the devices may carry network adapters for any network in which they may participate.

As noted above, embodiments of the inventions disclosed herein include software or asset privacy management interface instructions 116. As such, a general description of common computing software architecture is provided as expressed in layer diagrams in FIG. 3. Like the hardware examples, the software architecture discussed here is not intended to be exclusive in any way, but rather illustrative. This is especially true for layer-type diagrams, which software developers tend to express in somewhat differing ways. In this case, the description begins with layers starting with the O/S kernel 310, so lower level software and firmware has been omitted from the illustration, but not from the intended embodiments. The notation employed here is generally intended to imply that software elements shown in a layer use resources from the layers below and provide services to the layers above. However, in practice, all components of a particular software element may not behave entirely in that manner.

Figure 3:
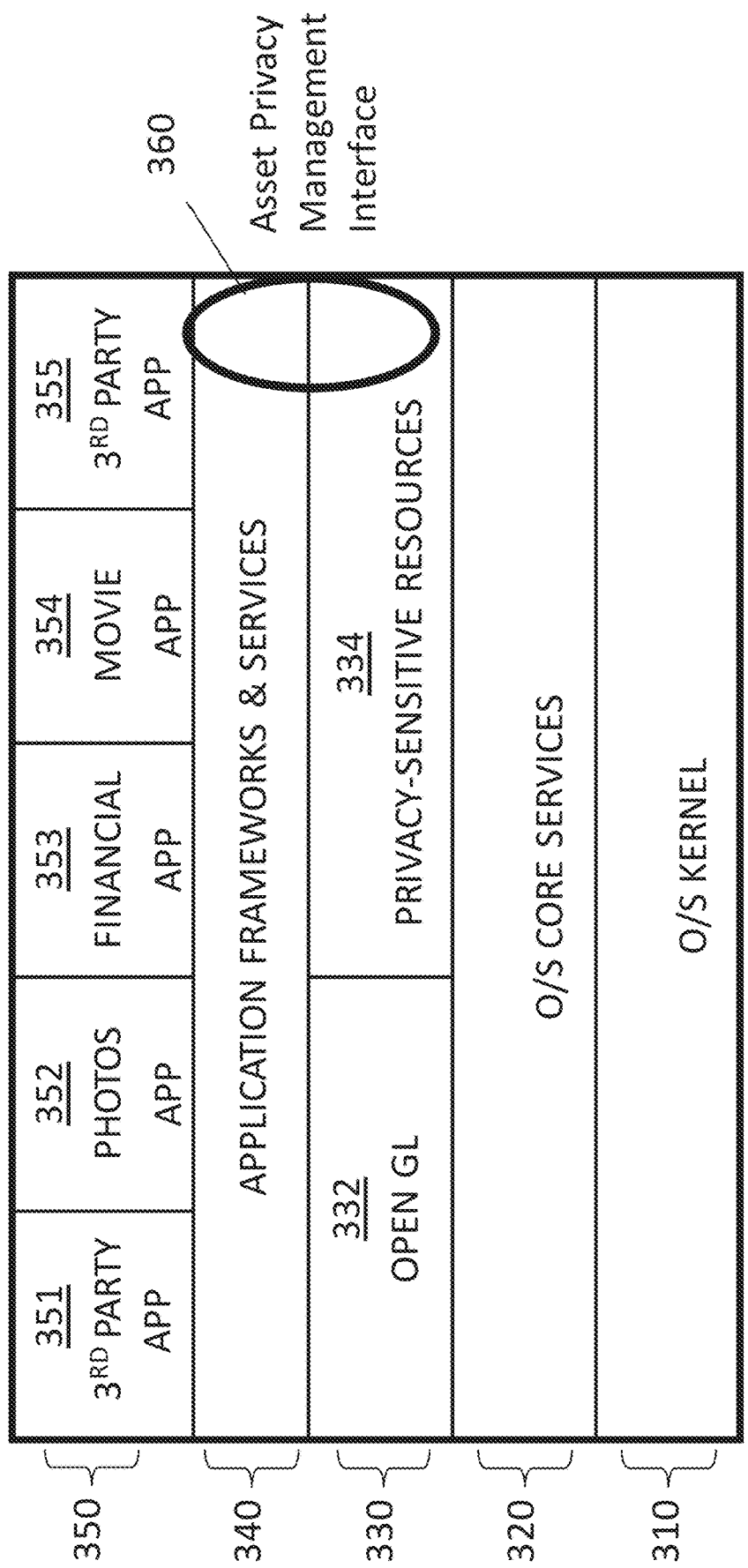
FIG. 3 is a diagram showing a representative software architecture.

With those caveats regarding software, referring to FIG. 3, layer 310 is the O/S kernel, which provides core O/S functions in a protected environment. Above the O/S kernel is layer 320 O/S core services, which extends functional services to the layers above, such as disk and communications access. Layer 330 is inserted to show the general relative positioning of the Open GL library 332 and similar application and privacy-sensitive resources 334. As used herein, the privacy-sensitive resources 334 include the scope of system resources that the framework's access control system manage access to. With the described technique, access to a privacy-sensitive resource 334 (e.g., a photo library, contacts, or calendar) with assets (e.g., photos or videos, contact items, or calendar items) is managed at an asset or sub-set of assets level rather than a whole resource level. Layer 340 is an amalgamation of functions typically expressed as multiple layers: applications frameworks and application services. For purposes of our discussion, these layers may provide high-level and often functional support for application programs that reside in the highest layer, shown here as layer 350. Example application programs in the higher layer 350 include a third-party application 351, a photos application 352, a financial application 353, a movie application 354, and another third-party application 355. In the example of FIG. 3, the photos application 352, the financial application 353, and the movie application 354 are examples of host applications (rather than third-party application) that do not need to request asset access to access privacy-sensitive resources 334. In other example embodiments, the application programs in the highest layer 350 include additional application programs and/or omit one or more of the represented application programs.

In some examples, the access control system used to provide asset privacy management operation attributes an access request to an entity that the user knows about (i.e. interacts with). Typically, the third-party applications 351 and 355 are "apps" from the "App Store". In other cases, each of the third-party applications 351 and 355 may be a Swift Playground, which is part of the Swift programming language development environment. In this scenario, the third-party application is a third-party entity with a name or identity and which the end-user installs, interacts with, and may delete.

Item 360 is intended to show the general relative position within the system architecture of asset privacy management interface instructions or software (e.g., the asset privacy management interface instructions 116 in FIGS. 1 and 2) that may perform the asset privacy management techniques discussed herein. The asset control system abstraction is enforced between the application frameworks and the privacy-sensitive resources (database & media) boundary. In other words, there is a process boundary between the application framework and where the enforcement of the limited library policy is applied to ensure any malicious third-party cannot circumvent the policy. In particular, in some embodiments, the asset privacy management techniques discussed herein may be performed by framework software through the use of an application programming interface. In certain embodiments, the framework software (or other software) accessible through an application programming interface (API) may identify asset privacy management triggers and provide options related to limited asset access as described herein. Of course, an application program may also perform the same functionality without the aid of a framework. Furthermore, on the server side, certain embodiments described herein may be implemented using a combination of server-application-level software and database software, with either possibly including frameworks and/or a variety of resource modules. In some embodiments, servers may be accessed over a network to perform asset privacy management operations by portable devices.

Figure 4:
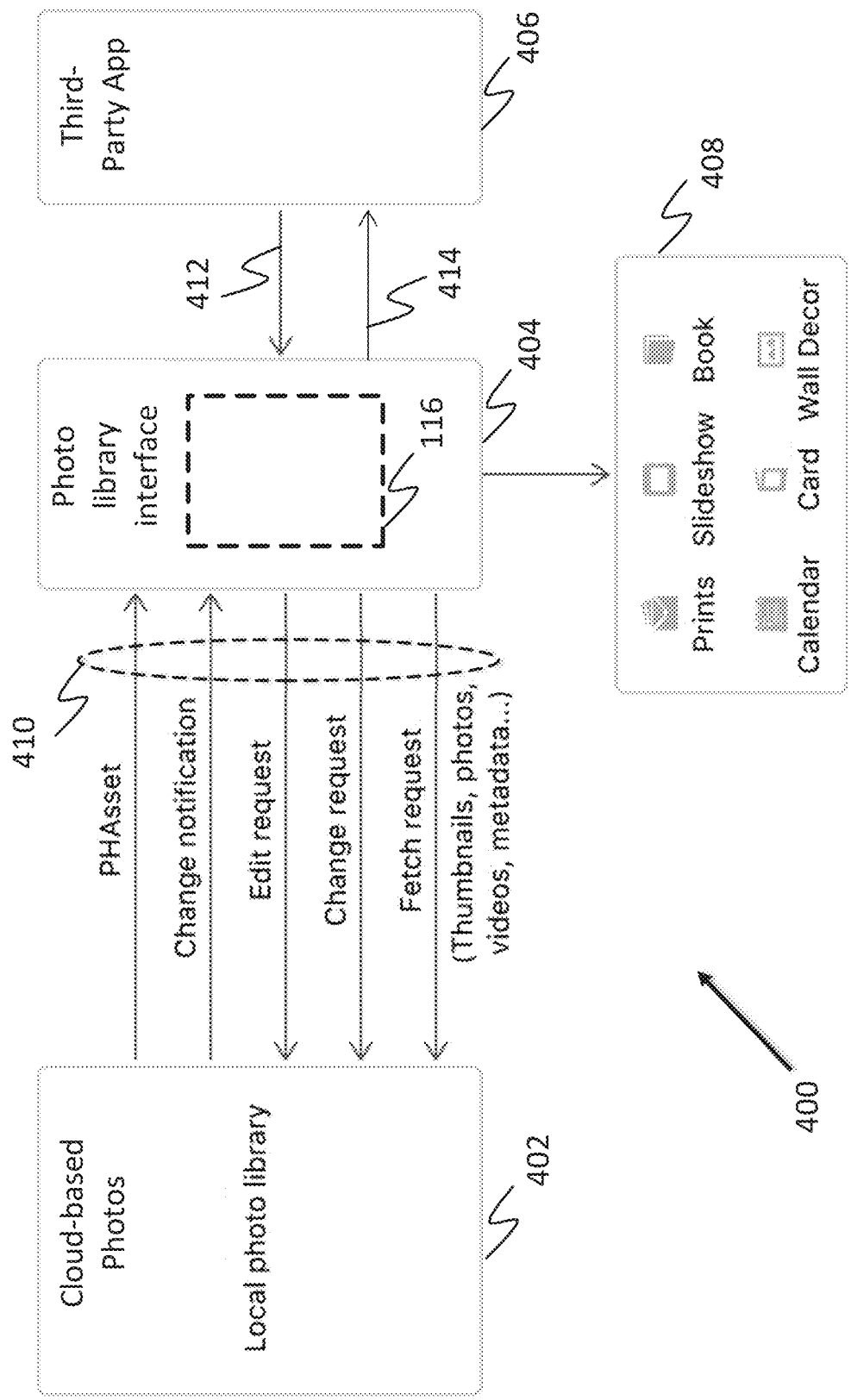
FIG. 4 is a diagram showing a photo library privacy management scenario.
Figure 5:
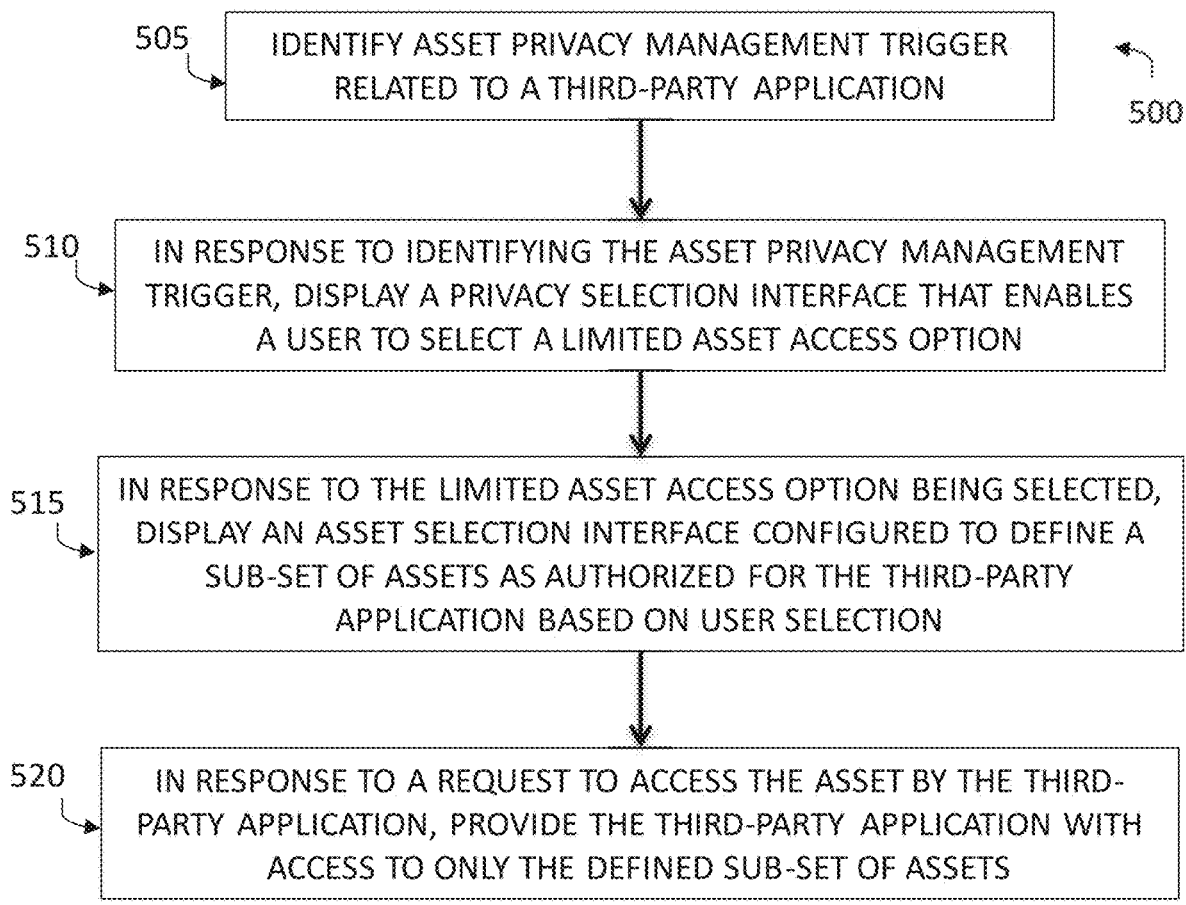
FIGS. 5-8 are flowcharts showing asset privacy management methods, in accordance with some embodiments of the disclosure.
Figure 6:
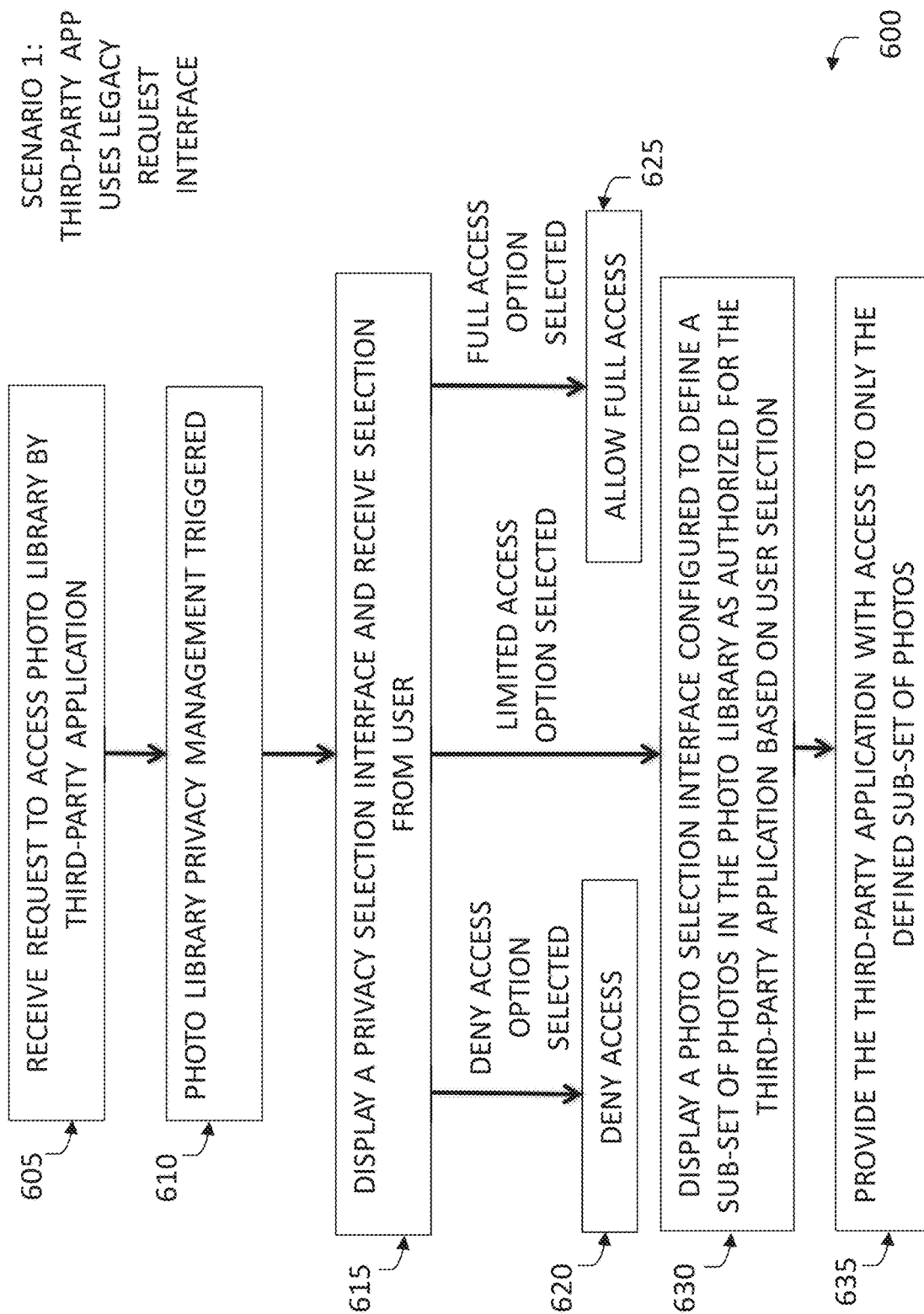

In some examples, the asset privacy management instructions or software 116 is part of a photo library privacy management scenario 400 as represented in FIG. 4. In the example of FIG. 4, the photo library privacy management scenario 400 includes a photo library 402 corresponding to cloud-based photos (e.g., photos uploaded from an end-user device to a user account) and/or a local photo library, where the photo library 402 is accessible via a photo library interface 404. The photo library interface 404 (e.g., the PhotoKit interface from Apple Inc.) provides classes that support building photo-editing extensions for a photos application (e.g., the photos application 352 in FIG. 3) on an end-user device. For different operating systems (e.g., iOS®, macOS®, and tvOS® operating systems, of which iOS is a registered trademark of Cisco Technology Inc., and macOS and tvOS are registered trademarks of Apple Inc.), the photo library interface 404 also provides direct access to the photo and video assets managed by the photos application. Example operations 410 that are handled by the photo library interface 404 include fetching and caching assets of the photo library 402 for display and playback, editing image and video content, or managing collections of assets such as albums or shared albums. Example projects 408 supported by the photo library interface 404 include prints, slideshows, books, calendars, greeting cards, and wall décor.

In the photo library privacy management scenario 400 of FIG. 4, a third-party application 406 is represented, where the third-party application 406 is able to submit asset access requests 412 and/or related communications to the photo library interface 404. It is to be understood that third-party application 406 illustrated here may alternatively comprise a third-party website, social network, or other online platform. The photo library interface 404 is able to provide a response 414 to such requests based on the asset privacy management instructions or software 116. In the proposed embodiments, the asset privacy management instructions or software 116 supports a limited asset access option, where a sub-set of photos or videos in the photo library 402 are defined as authorized for use by the third-party application 406 based on user selection. In some examples, a user is able to choose between a full asset access option, a no asset access option, and the limited asset access option, e.g., in response to different asset privacy management triggers. In the photo library privacy management scenario 400 of FIG. 4, the limited library policy is applied in the photo library 402. For further clarification, the photo library interface 404 is instantiated in the third-party process and the photo library 402 runs in an out of process service that manages access to the assets of privacy-sensitive resources. The limited library policies are enforced in this out of process photos service.

FIGS. 5-8 are flowcharts showing asset privacy management methods in accordance with some embodiments of the disclosure. In the asset privacy management method 500 of FIG. 5, an asset privacy management trigger related to a third-party application is identified at block 505. Example asset privacy management triggers include re-booting an end-user device after update of the operation system to include a limited asset access option, receiving an asset privacy management request from a third-party application, receiving an asset access request from a third-party application, installing or using a third-party application for the first time, using a third-party application for a pre-determined amount of time, or selecting an operating system asset management setting related to a third-party application.

In response to identifying the asset privacy management trigger, a privacy selection interface is displayed that enables a user to select a limited asset access option at block 510. In some examples, the privacy selection interface enables a user to select between a full asset access option, a no asset access option, and the limited asset access option. In response to the limited asset access option being selected, an asset selection interface is displayed at block 515, where the asset selection interface is configured to define a sub-set of assets as authorized for the third-party application based on user selection. Example assets of an end-user device includes photos or videos in a photo library, a microphone, a camera, and an audio recording library. In different examples, a sub-set of assets is defined using a folder-based definition, a date-based definition, or a content based-definition. Other sub-set definitions are possible, and may even rely on image analysis (e.g., facial recognition), negative definitions (e.g., do not include photos of a particular type, date, or folder), or dynamic sub-sets (e.g., include all photos in a given folder, even if new photos are added to the folder). In some examples, the operations of blocks 510 and 515 are provided by one UI that enables a user to select that scope of the access and to select the subset of assets in one operation. For example, an empty set of selected assets could be interpreted as a Deny, a partial set of selected assets could be interpreted as Limited asset access, and all assets selected could be interpreted as Full access. In response to a request to access the assets of the end-user device by the third-party application, access to the defined sub-set of assets is provided to the third-party application at block 520. In some examples, the operations of block 520 involves adding a definition for the sub-set of assets to an asset privacy management database that stores indexed information associating each of a plurality of defined sub-sets of assets and respective third-party application identifiers. In such case, in response to identifying the request to access assets of the end-user device by the third-party application, the operations of block 520 involve using the indexed information in the database to provide the third-party application with access to only the defined sub-set of assets.

Other options for the asset privacy management method 500 include use of transparent operations with regard to the third-party application. For example, operations of the privacy selection interface at block 510 and the photo selection interface at block 515 may be transparent to the third-party application. As used herein, "transparent" refers to the lack of awareness of the third-party application in relation to a given interface or related operations. In other examples, the third-party application at least is aware that a user has selected the limited asset access option. Another option involves re-setting an asset privacy management trigger or otherwise identifying a new asset privacy management trigger after an asset privacy policy has already been established with a third-party application. In one example, in response to identifying that new assets were added after the asset privacy management database was last updated, a new request to access assets of the end-user device by the third-party application is interpreted as an asset privacy management trigger. As desired, asset privacy management operations are repeated for each third-party application as new assets become available.

A typical user interaction with a third-party application involves installing the third-party application on an end-user device and executing the third-party application. Another option is to use the end-user device to access a website and related features associated with the third-party application. In either case, the end-user device has assets (e.g., a photo library, a microphone, a camera, an audio recording library), and the third-party application includes features that access the assets. Example features of a third-party application that would access assets of an end-user device include teleconferencing features, photo editing features, social media features, and online storage features.

Embodiments of the disclosure seek to provide the user of an end-user device with improved asset privacy management options by adding a limited asset access option. In some examples, the limited asset access option is added by updating the operating system of the end-user device. Once the operating system is updated, the limited asset access option is selectable in response to asset privacy management triggers as described herein. Once an asset privacy management trigger is identified, a privacy selection interface is displayed that enables the user to select the limited asset access option for a given third-party application. In some examples, the privacy selection interface enables a user to select between a full asset access (e.g., access to all photos in a photo library) option, a no asset access (e.g., access to no photos in a photo library) option, and the limited asset access (e.g., access to some photos in a photo library) option.

When the limited asset access option is selected, an asset selection interface is displayed that enables a user to define a sub-set of assets as authorized for the third-party application. Thereafter, a third-party application is able to access the sub-set of assets defined as authorized for the third-party application. As desired, asset privacy management is performed for the same third-party application multiple times.

One of the considerations for the proposed asset privacy management techniques involves handling different third-party application scenarios. In some scenarios, a third-party application uses a legacy request interface to communicate with the end-user device, where the third-party application may or may not already have an asset privacy policy in place with the end-user device. Such a scenario is represented in the asset privacy management method 600 of FIG. 6. For the asset privacy management method 600, a third-party application uses a legacy request interface to request access to photos of an end-user device's photo library (see e.g., FIG. 4). In such case, installation of an updated operating system with a limited asset access option may be treated as an asset privacy management trigger to override previous photo library privacy management policy.

As shown, the asset privacy management method 600 includes receiving a request to access the photo library from a third-party application at block 605. At block 610, photo library privacy management is triggered. At block 615, a privacy selection interface is displayed, and a user selection is received. At block 620, access to the photo library by the third-party application is denied if a user selects a deny access option at block 615. At block 625, full access to the photo library is allowed if a user selects a full access option at block 615. If a user selects a limited access option, a photo selection interface is displayed and is configured to define a sub-set of photos in the photo library as authorized for the third-party application based on user selection at block 630. At block 635, access to the defined sub-set of photos is provided. In the asset privacy management method 600, the use of the limited access option and related operations in blocks 615, 630, and 635 is transparent to the third-party application. From the perspective of the third-party application, access to the photo library is either allowed or not allowed, and the sub-set definitions used to limit the photos available to the third-party application is unknown to the third-party application.

In some examples, the asset privacy management method 600 involves identifying a request to access assets by the third-party application as an asset privacy management trigger, where the end-user device is configured to return a value indicating whether full access or no access is authorized based on user selection. In response to the asset privacy management trigger, the privacy selection interface for selecting asset privacy management options and the asset selection interface for defining a limited sub-set of assets (i.e., if the limited asset option is selected) is used in a manner that is transparent to the third-party application using the legacy request interface. In one example, even if a third-party application was given full access to end-user device's photo library previously, access to the photo library can be limited using the privacy selection interface and photo selection interface operations as described herein. In this example, a limited photo library option selected by a user and related operations results in a virtual access policy to the photo library for the third-party application. From the third-party application perspective, full access to the photo library is given, where the photo library is limited by the virtual access policy to the sub-set of photos defined by the user.

In other scenarios, a third-party application uses an updated request interface and an opt-out option that enables the third-party application to request access to photos in an end-user device's photo library without awareness of the limited asset access option. In other words, the legacy binary indicators (full access or no access) are used for communications between the end-user device and the third-party application. Accordingly, the third-party application will receive a response from the end-user device (full access or no access) that does not indicate when the limited access option is used. With the updated request interface and opt-out option scenario, installation of an updated operating system with the limited asset access option may be treated as an asset privacy management trigger that overrides any previous photo library privacy management policy with the third-party application. In some examples, installation of the updated operating system results in introduction of new features such as the limited asset access option and related operations without a related third-party application request. In such case, a user may select the limited asset access option for use with one or more third-party applications using available operating system settings or a new features introduction process. Subsequently, the photo library privacy management settings selected by the user (including limited access option and related sub-set definitions for third-party application) will be used in response to subsequent photo library access requests from the third-party application.

Figure 7:
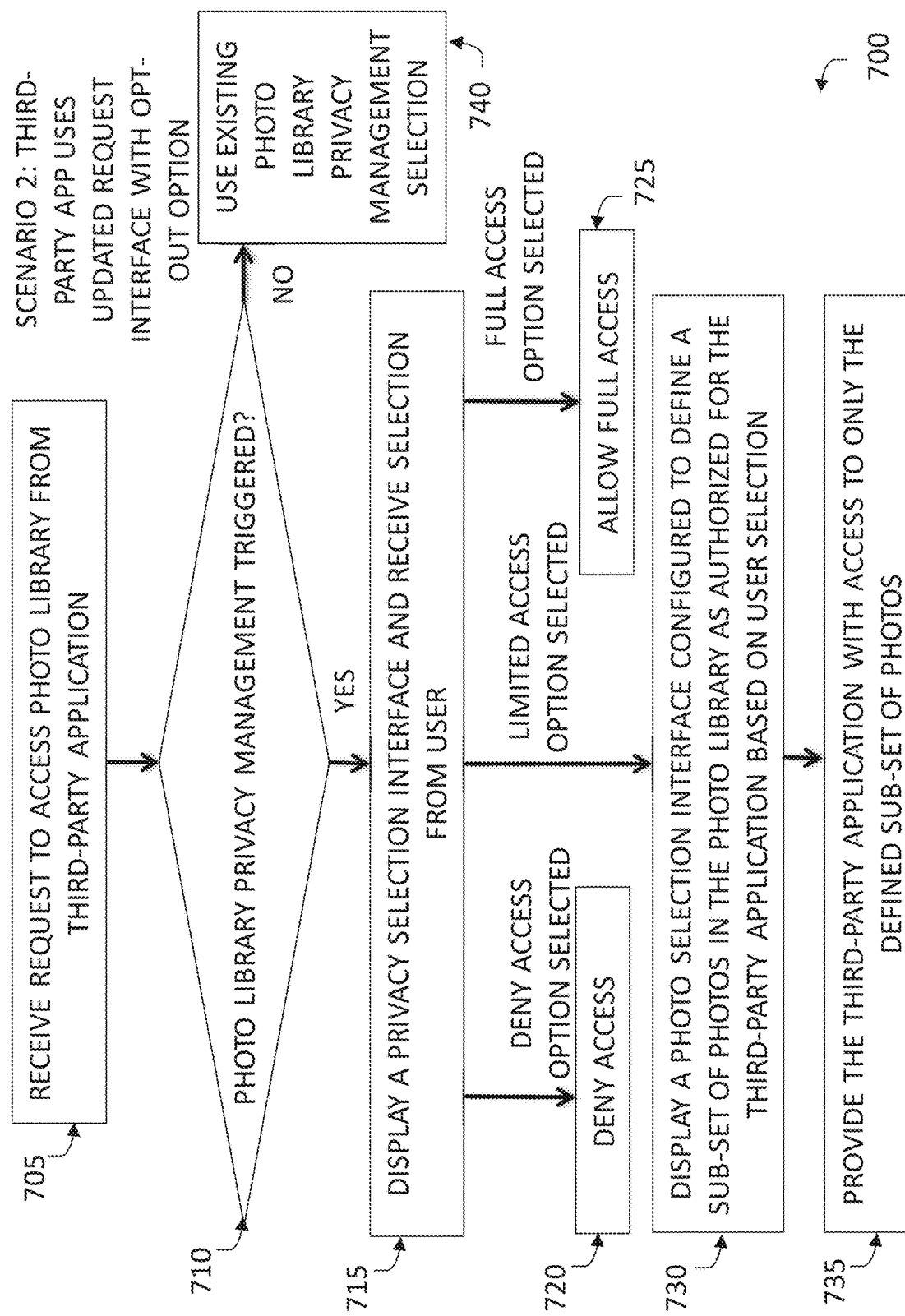

A scenario based on an updated request interface and opt-out option (where legacy binary indicators are used for communications between the end-user device and the third-party application) is represented in the asset privacy management method 700 of FIG. 7. As shown, the asset privacy management method 700 includes receiving a request to access the photo library from a third-party application at block 705. If photo library privacy management is not triggered when the request is received (decision block 710), an existing photo library privacy management selection or policy is used at block 740. This could be the case, for example, if a limited access option and related policies are selected by a user via the available operating system settings. If photo library privacy management is triggered when the request is received (decision block 710), a privacy selection interface is displayed, and a user selection is received at block 715. At block 720, access to the photo library by the third-party application is denied if the user selects a deny access option at block 715. At block 725, full access to the photo library is allowed if a user selects a full access option at block 715. If a user selects the limited access option, a photo selection interface is displayed and is configured to define a sub-set of photos in the photo library as authorized for the third-party application based on user selection at block 730. At block 735, access to the defined sub-set of photos is provided. From the perspective of the third-party application, access to the photo library is either allowed or not allowed, and the sub-set definitions used to limit the photos available to the third-party application is unknown to the third-party application.

In other scenarios, a third-party application uses an updated request interface and an opt-in option that enables the third-party application to submit photo library privacy management requests to the end-user device and to receive a non-binary indication from the end-user device indicating whether full access, limited access, or no access is given. In such scenarios, the third-party application will be aware when a limited access option is selected by the user and has the ability to submit photo library privacy management requests to enable the user to update the sub-set of assets associated with limited access option. Even though the third-party application receives an indication that the limited access option is being used and even though the third-party application can submit photo library privacy management requests, the privacy selection interface for selecting asset privacy management options and the asset selection interface for defining a limited sub-set of assets (if the limited asset option is selected) is still used in a manner that is transparent to the third-party application. In one example, even if a third-party application was previously given full access to end-user device's photo library, access to the photo library can be limited using the privacy selection interface and photo selection interface operations as described herein. As desired, a limited photo library option is selected by a user and related operations result in a virtual access policy to the photo library for the third-party application. From the third-party application perspective, privacy management of the photo library is based on the updated non-binary options (e.g., full access, limited access, or no access). If the limited access option is selected by a user, the photos visible to the third-party application will be limited by the virtual access interface to the sub-set of photos defined by the photo selection interface.

Figure 8:
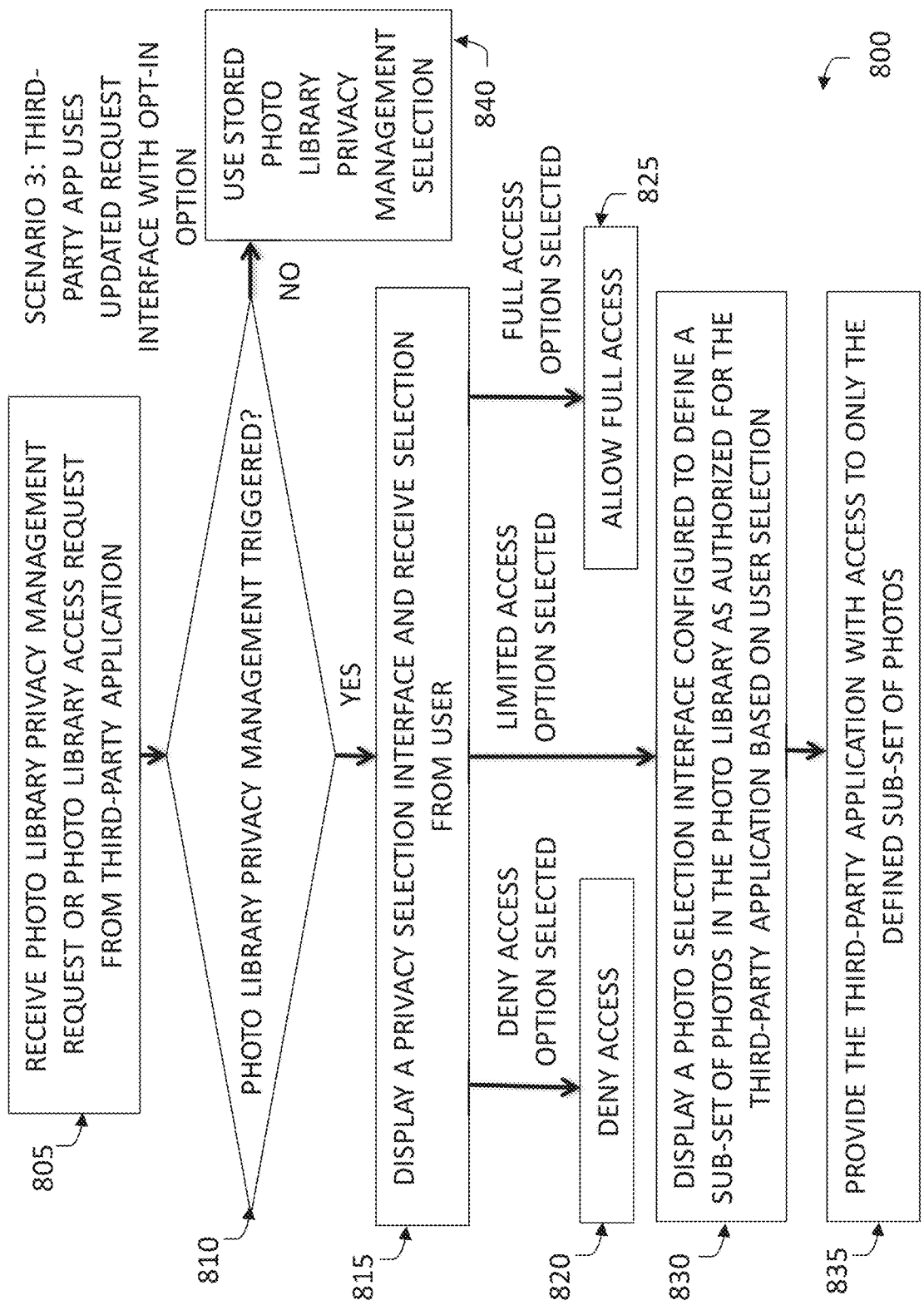

An updated request interface and opt-in scenario is represented in the asset privacy management method 800 of FIG. 8. As shown, the asset privacy management method 800 includes receiving a photo library privacy management request or a photo library access request from a third-party application at block 805. If photo library privacy management is not triggered when the request from block 805 is received (decision block 810), an existing photo library privacy management selection or policy is used at block 840. This could be the case, for example, if a limited access option and related policies are selected by a user via the available operating system settings. At block 815, a privacy selection interface is displayed, and a user selection is received. At block 820, access is to the photo library by the third-party application is denied if a user selects a deny access option at block 815. At block 825, full access to the photo library is allowed in response to a user selecting a full access option at block 815. At block 830, a photo selection interface is displayed and is configured to define a sub-set of photos in the photo library as authorized for the third-party application based on user selection. At block 835, access to the defined sub-set of photos is provided. From the perspective of the third-party application, access to the photo library is either allowed, limited, or not allowed (at least an indication is provided. Also, the third-party application may be allowed to provide a message to a user when making a photo library privacy management request. However, the sub-set definitions used to limit the photos available to the third-party application will be unknown to the third-party application. When the limited access option is selected, a virtual access policy to the photo library is established for the third-party application. From the third-party application perspective, limited access to the photo library is given, where the details of the virtual access policy is unknown to the third-party application.

In some examples, asset privacy management with a limited access option as described herein may be provided by an access control system, which determines an authorization right to a specified privacy-sensitive resource by a third-party application. The authorization right may represent an Unknown state, a Deny state, an Allow state, or a Limited state. The Unknown state refers to a state in which the access control system has no existing record for the tuple {third-party application, privacy-sensitive resource}. The Deny state refers to a state in which the user has not consented to allow access for the third-party application to the privacy-sensitive resource. The Allow state refers to a state in which the user has consented to allow access for the third-party application to the privacy-sensitive resource and all of its assets at any given point in the future. The Limited state refers to a state in which the user has consented to allow access for the third-party application to a sub-set of the assets of the privacy-sensitive resource.

In some examples, the access control system may keep additional information associated with the tuple {3rd party application, privacy-sensitive resource}, such as version information, date timestamps, etc., to implement access policies needing that data. Also, the access control system provides the authorization right for the tuple {3rd party application, privacy-sensitive resource} to an asset management system, which can then use the right to implement an access policy for the assets under the control of the assets management system.

No limitation is intended by these hardware and software descriptions and the varying embodiments of the inventions herein may include any manner of computing device such as Macs, PCs, PDAs, phones, servers, or even embedded systems.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., many of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

We claim:

1. A method of managing third-party application access to assets of an end-user device, the method comprising:
   identifying an asset privacy management trigger on the end-user device related to a third-party application;
   in response to identifying the asset privacy management trigger, displaying a privacy selection interface that enables a user to select a limited asset access option;
   in response to the limited asset access option being selected, displaying an asset selection interface configured to:
     display individual assets of an asset library; and
     define a sub-set of assets of the end-user device as authorized for the third-party application based on user selection of a sub-set of the displayed individual assets of the asset library; and
   in response to a request to access assets of the end-user device by the third-party application, providing the third-party application with access to only the defined sub-set of assets.

2. The method of claim 1, wherein the privacy selection interface enables the user to select between a full asset access option, a no asset access option, and the limited asset access option.

3. The method of claim 1, wherein the asset privacy management trigger involves an operating system settings selection by the user.

4. The method of claim 1, wherein the asset privacy management trigger involves a third-party application request to access assets of the end-user device.

5. The method of claim 4, wherein operations of the privacy selection interface and the asset selection interface are transparent to the third-party application.

6. The method of claim 1, wherein the asset privacy management trigger involves a third-party application request to initialize asset privacy management by the user.

7. The method of claim 1, further comprising adding a definition of the sub-set of assets to a database that stores indexed information associating each of a plurality of defined sub-sets of assets and respective third-party application identifiers.

8. The method of claim 7, further comprising:
   identifying the request to access assets of the end-user device by the third-party application; and
   using the indexed information in the database to provide the third-party application with access to only the defined sub-set of assets.

9. The method of claim 7, further comprising:
   in response to identifying that new assets were added after the database was last updated, interpreting a new request to access assets of the end-user device by the third-party application as an asset privacy management trigger.

10. The method of claim 1, further comprising providing a non-binary indication from the end-user device to the third-party application indicating whether a full access option, a limited access option, or a no access option is selected.

11. A computer-readable medium comprising instructions that, when executed, configure a processor to:
   identify an asset privacy management trigger related to a third-party application;
   in response to identifying the asset privacy management trigger, display a privacy selection interface that enables a user to select a limited asset access option;
   in response to the limited asset access option being selected, display an asset selection interface configured to:
      display individual assets of an asset library; and
      define a sub-set of assets of an end-user device as authorized for the third-party application based on user selection of a sub-set of the displayed individual assets of the asset library; and
   in response to a subsequent request to access assets of the end-user device by the third-party application, provide the third-party application with access to only the defined sub-set of assets.

12. The computer-readable medium of claim 11, wherein the instructions configure the processor to display the privacy selection interface with options including a full asset access option, a no asset access option, and the limited asset access option.

13. The computer-readable medium of claim 11, wherein the instructions configure the processor to identify an operating system settings selection by the user as the asset privacy management trigger.

14. The computer-readable medium of claim 11, wherein the instructions configure the processor to identify a third-party application request to access assets of the end-user device as the asset privacy management trigger.

15. The computer-readable medium of claim 11, wherein the instructions configure the processor to display the privacy selection interface and the asset selection interface in a manner that is transparent to the third-party application.

16. The computer-readable medium of claim 11, wherein the instructions configure the processor to display the privacy selection interface in response to a third-party application request to initialize asset privacy management by the user.

17. The computer-readable medium of claim 16, further comprising:
   in response to identifying new assets were added after a database that stores indexed information associating each of a plurality of defined sub-sets of assets and respective third-party application identifiers was last updated, interpreting a new request to access assets of the end-user device by the third-party application as an asset privacy management trigger.

18. The computer-readable medium of claim 11, wherein the instructions configure the processor to provide a non-binary indication to the third-party application indicating whether a full access option, a limited access option, or a no access option is selected.

19. A system comprising:
   one or more processors;
   one or more cameras configured to capture photos;
   a memory for storing program instructions for the one or more processors, where the instructions, when executed, cause the one or more processors to:
      maintain a photo library based on the captured photos,
      identify a photo library privacy management trigger related to a third-party application;
      in response to identifying the photo library privacy management trigger, display a privacy selection interface that enables a user to select a limited photo library access option;
      in response to the limited photo library access option being selected, display an asset selection interface configured to:
         display individual assets of an asset library; and
         define a sub-set of photos in the photo library as authorized for the third-party application based on user selection of a sub-set of the displayed individual assets of the asset library;
      in response to a subsequent request to access the photo library by the third-party application, provide the third-party application with access to only the defined sub-set of photos.

20. The system of claim 19, wherein the instructions, when executed, further cause the one or more processors to display the privacy selection interface with options including a full photo library access option, a no photo library access option, and the limited photo library access option.

21. The system of claim 19, wherein the instructions, when executed, further cause the one or more processors to identify an operating system settings selection by the user as the photo library privacy management trigger.

22. The system of claim 19, wherein the instructions, when executed, further cause the one or more processors to identify a third-party application request to access the photo library as the photo library privacy management trigger.

23. The system of claim 19, wherein the instructions, when executed, further cause the one or more processors to display the privacy selection interface and the asset selection interface in a manner that is transparent to the third-party application.

24. The system of claim 19, wherein the instructions, when executed, further cause the one or more processors to display the privacy selection interface in response to a third-party application request to initialize photo library privacy management by the user.

25. The system of claim 19, wherein the instructions, when executed, further cause the one or more processors to provide a non-binary indication to the third-party application indicating whether a full access option, a limited access option, or a no access option is selected.

* * * * *